United States Patent
Forrest

(10) Patent No.: US 10,232,389 B1
(45) Date of Patent: Mar. 19, 2019

(54) FLUID DELIVERY SYSTEM FOR COLLECTED RAINWATER

(71) Applicant: Rainflex, LLC, Cary, NC (US)

(72) Inventor: Paul Bradley Forrest, Cary, NC (US)

(73) Assignee: RAINFLEX, LLC, Cary, NC (US)

( * ) Notice: Subject to any disclaimer, the term of this patent is extended or adjusted under 35 U.S.C. 154(b) by 468 days.

(21) Appl. No.: 14/918,504

(22) Filed: Oct. 20, 2015

Related U.S. Application Data

(60) Provisional application No. 62/066,319, filed on Oct. 20, 2014.

(51) Int. Cl.
| | |
|---|---|
| B05B 15/70 | (2018.01) |
| B05B 7/04 | (2006.01) |
| F15D 1/06 | (2006.01) |
| B05B 3/02 | (2006.01) |
| E03B 3/02 | (2006.01) |

(52) U.S. Cl.
CPC ............ B05B 7/0408 (2013.01); B05B 3/02 (2013.01); B05B 15/70 (2018.02); E03B 3/02 (2013.01); F15D 1/06 (2013.01)

(58) Field of Classification Search
CPC ........... F15D 1/06; B05B 7/0408; B05B 3/02; B05B 15/10; B05B 15/70; E03B 3/02
USPC ......................................................... 239/203
See application file for complete search history.

(56) References Cited

U.S. PATENT DOCUMENTS

| | | | | |
|---|---|---|---|---|
| 2,865,674 | A * | 12/1958 | Jelmeland | A62C 35/605 137/397 |
| 6,523,584 | B1 * | 2/2003 | Rehrig | H02G 3/0481 150/154 |
| 6,962,464 | B1 * | 11/2005 | Chen | E01C 11/226 404/2 |
| 6,964,135 | B1 * | 11/2005 | Slodov | E04D 13/0765 52/11 |
| 6,966,333 | B1 * | 11/2005 | Kuehneman | E03B 3/03 137/357 |
| 6,991,402 | B2 * | 1/2006 | Burkhart | E03F 1/005 405/126 |
| 6,991,734 | B1 * | 1/2006 | Smith | E03F 1/002 210/170.03 |
| 8,132,583 | B2 * | 3/2012 | Mowatt, Sr. | E04F 10/0603 135/117 |
| 2012/0279583 | A1 * | 11/2012 | Forrest | E03B 3/03 137/357 |

* cited by examiner

*Primary Examiner* — Chee-Chong Lee
(74) *Attorney, Agent, or Firm* — NK Patent Law, PLLC

(57) ABSTRACT

A fluid delivery system utilizes Bernoulli pressure differentials and kinetic forces is provided. The system includes a pressurized channel in fluid communication with a flexible pressurized line for translating pressurized fluids to a mixing chamber. The mixing chamber is also in fluid communication with a source channel receiving fluids from a flexible source line. The mixing chamber is configured for entraining the source fluids with the pressurized fluids 26 using Bernoulli principles. Kinetic valves may be used in conjunction with, or in lieu of, the Bernoulli siphoning.

16 Claims, 15 Drawing Sheets

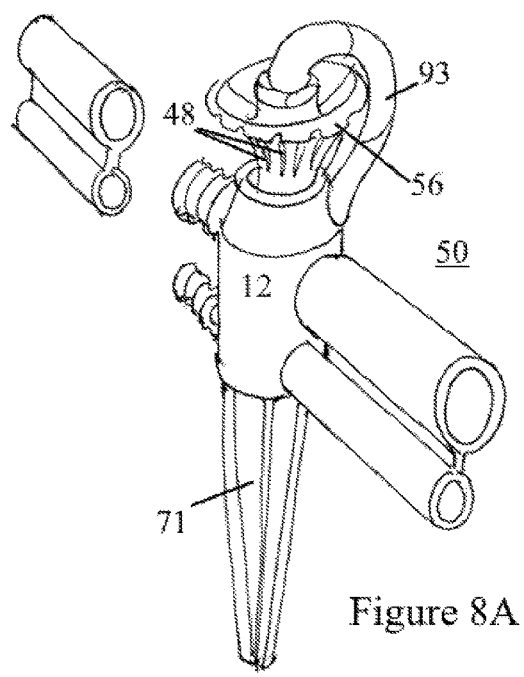
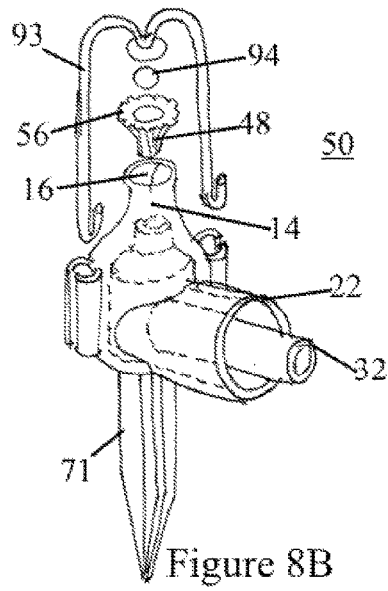
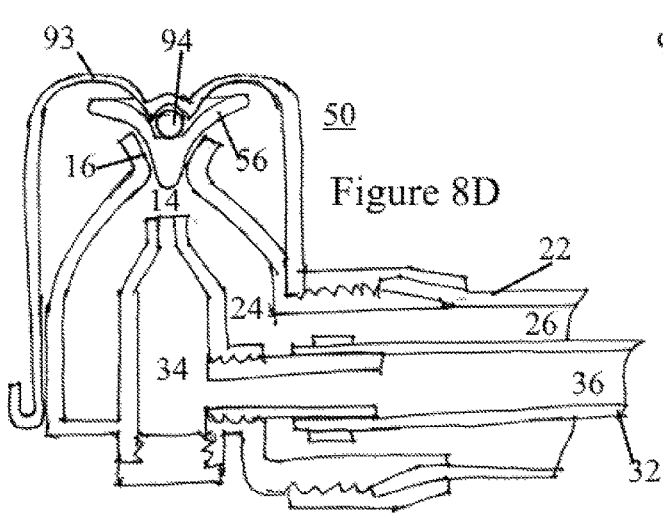
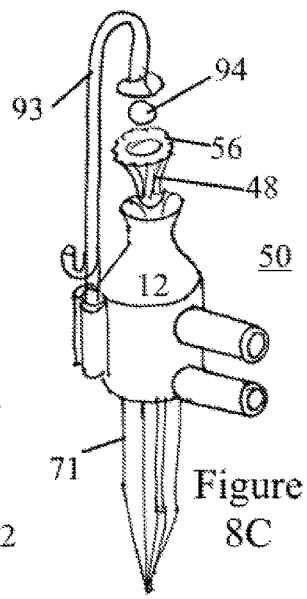
Figure 8A
Figure 8B
Figure 8D
Figure 8C

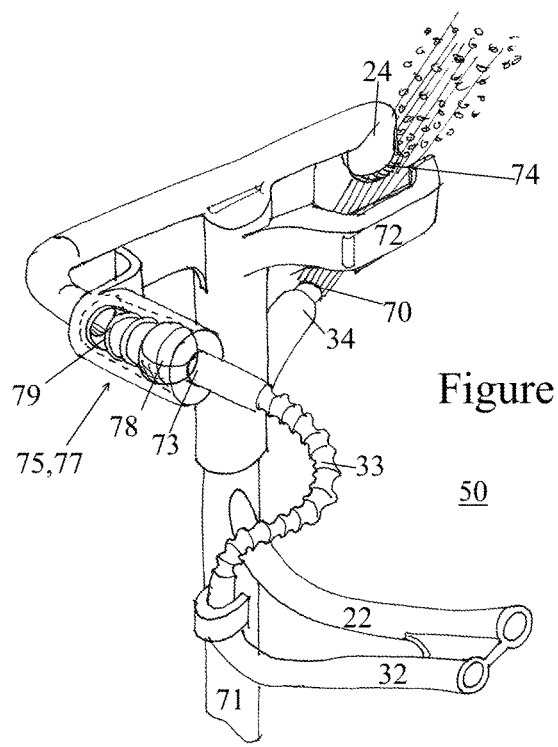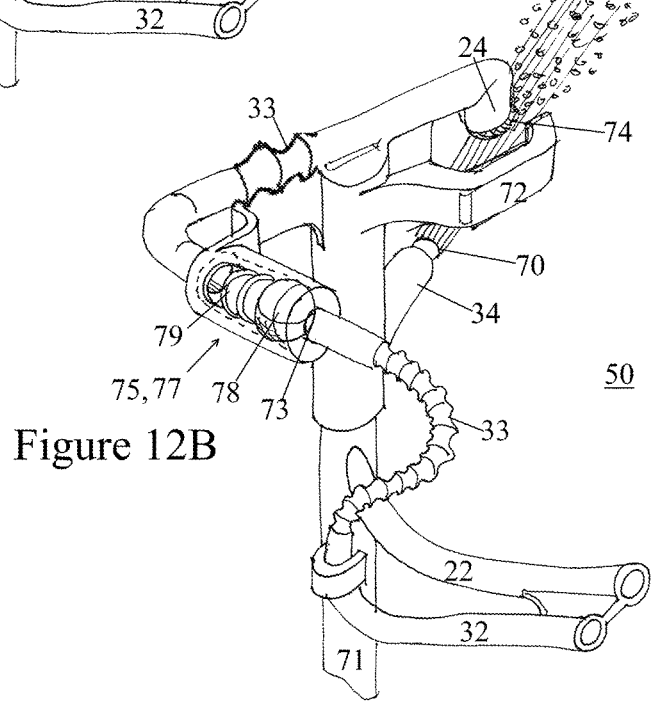

FLUID DELIVERY SYSTEM FOR COLLECTED RAINWATER

CROSS-REFERENCE TO RELATED APPLICATIONS

This application is a non-provisional claiming the benefit of U.S. Provisional Application 62/066,319 filed Oct. 20, 2014, which is hereby incorporated by reference in its entirety.

TECHNICAL FIELD

The presently disclosed subject matter is directed towards a fluid delivery system having improved fluid delivery characteristics. Specifically, the fluid delivery system may be used to deliver collected rainwater efficiently using a second water source.

BACKGROUND

Water conservation has become increasingly important due to limited water resources amid rising populations and increased demand for water. Efforts to reduce water consumption have had limited success.

Limited water resources have had an adverse impact on the ability of homeowners to water their lawns and gardens. Furthermore, governments and municipalities have limited the use of irrigation and lawn watering in times of drought and limited water supply. This is problematic in times of drought as homeowners may not be allowed to water their lawns that may already be suffering from the drought conditions. Repair of lawns that have suffered from drought conditions is expensive. Furthermore, drought-stricken lawns are unsightly and may impact the land value of a homeowner. Additionally, water tables around the world continue to be depleted faster than they are being replenished such that water conservation will continue to be a growing social initiative.

Drought-stricken lawns need water through either irrigation or natural precipitation such as rainfall. However, rainfall is unpredictable as far as occurrence and amounts. For best results in lawn maintenance or tending a garden, routine and regular irrigation and watering are needed.

One manner of providing irrigation and watering may include using a storage tank or rain barrel that is designed to collect rainwater coming through a gutter assembly. One manner of collecting rainwater from a gutter assembly may include cutting through an existing downspout assembly and attaching a device such as a fitting with a hose to the downspout assembly. However, this device may not be aesthetically pleasing or functional. Other devices may not be easily installed upon a gutter assembly. These devices may also clog easily or may have a debris filter that must be cleaned to function properly.

Another difficulty presented by existing rainwater collection systems is that the storage tank must be placed under the existing downspout which makes the tank conspicuous and difficult to conceal.

Still another disadvantage of existing systems is that those systems rely on gravity for evacuation of the collected water. For this reason, the collection point in which water is collected within the gutter assembly of certain systems is often raised off of the ground to increase pressure, thus making it even more difficult to conceal.

Accordingly, there remains a need for a device that addresses the various disadvantages associated with previous devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a fluid delivery system is provided. The fluid delivery system includes a pressurized channel in fluid communication with a flexible pressurized line for translating pressurized fluids; a source channel in fluid communication with a flexible source line for translating source fluids; a mixing chamber engaged with both channels for entraining the source fluids with the pressurized fluids using Bernoulli principles; and a discharge aperture in fluid communication with the mixing chamber for discharging the fluids from the mixing chamber.

According to at least one embodiment of the disclosed subject matter, the fluid delivery system further includes at least one sprinkler head housing the mixing chamber and the discharge aperture for distributing the fluids into the surrounding environment.

According to at least one embodiment of the disclosed subject matter, a fluid delivery system is provided comprising: a pressurized channel in fluid communication with pressurized rotary arms each having a pressurized exhaust aperture and extending from a central hub; a source channel in fluid communication with source rotary arms each having a source exhaust aperture and extending from the hub, wherein each source rotary arm is located proximal to a respective pressurized rotary arm; wherein pressurized fluids provide rotational force for rotating the hub and the arms about a central axis, wherein centrifugal forces created by the rotation draws source fluids to the source exhaust apertures for distribution into a path of the pressurized fluids exiting the pressurized exhaust apertures of the respective pressurized rotary arm.

According to at least one embodiment of the disclosed subject matter, a fluid delivery system is provided comprising: a pressurized channel in fluid communication with a flexible pressurized line, the pressurized channel defining a pressurized exhaust aperture on one end for discharging pressure fluids; an impact arm for being rotated by the pressure fluids; a source channel in fluid communication with a flexible source line, the source channel defining a source exhaust aperture on one end for discharging source fluids for entrainment with the pressure fluids; and a kinetic valve for translating the source fluids through the source channel upon rotational impact of the impact arm.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

FIGS. 8A-8C are perspective views of a fluid delivery system having a conical discharge valve according to one or more embodiments of the presently disclosed subject matter.

FIG. 8D is a cross-sectional view of a fluid delivery system having a conical discharge valve according to one or more embodiments of the presently disclosed subject matter.

FIGS. 12A-12B are perspective views of a cylindrical chamber pump interacting with an impact arm according to one or more embodiments of the presently disclosed subject matter.

DETAILED DESCRIPTION

Figure 1A:
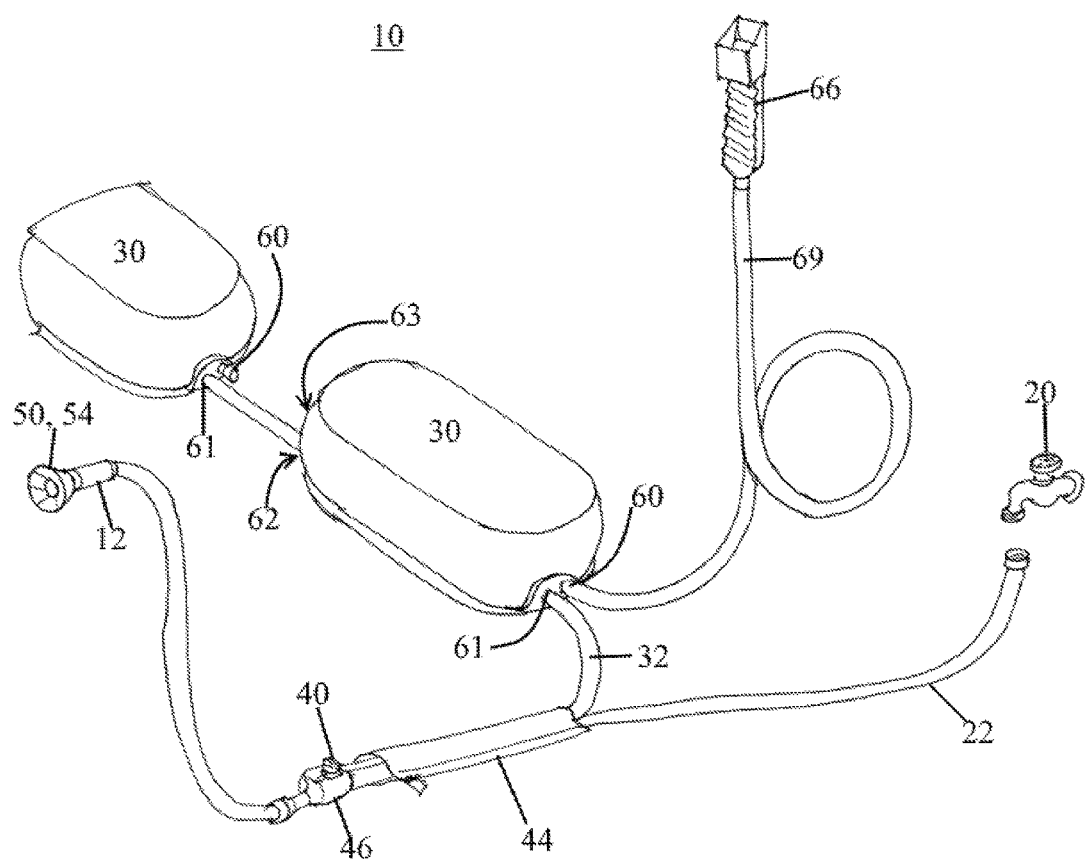
FIGS. 1A-1C are perspective views of a fluid delivery system including a static source and a pressurized source according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

This application includes, or is related to, many features and embodiments that are represented in one or more co-pending or issued patents owned by the current assignee. U.S. application Ser. No. 13/101,123 filed May 4, 2011 and issued as U.S. Pat. No. 8,496,810 on Jul. 30, 2013, and U.S. application Ser. No. 14/110,383 filed Nov. 17, 2013 are hereby incorporated by reference in their entirety.

Figure 1B:
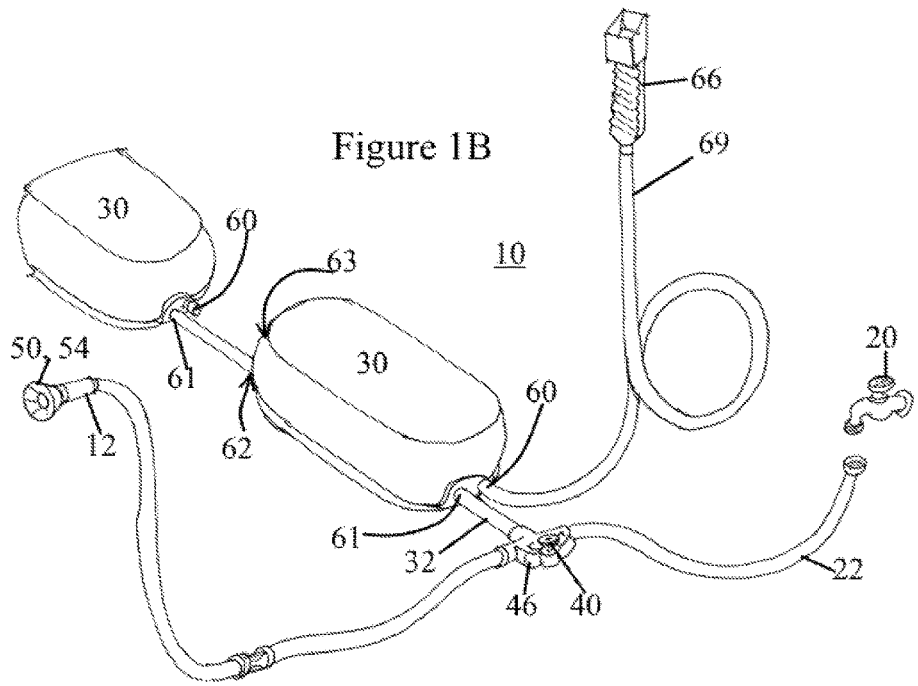
Figure 1C:
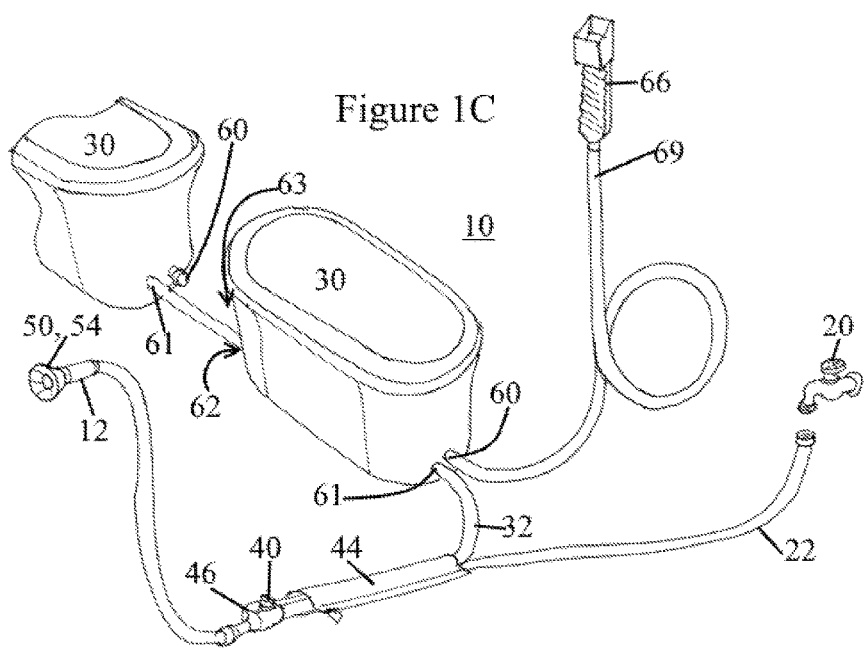

As shown in FIGS. 1A-1C, various embodiments of the fluid delivery system 10 are provided. Each of these fluid delivery systems 10 includes both a static source 30 of water and a spigot as a pressurized source 20 of water, and each static source 30 receives collected water from a rain collection device 66. In FIGS. 1A and 1B, the system 10 includes two flexible bladders as the static sources 30 of water, whereas FIG. 1C includes rigid containers as the static sources 30. The bladder 30 may be formed from a flexible material so as to allow the bladder 30 to expand and contract as necessary depending on the volumetric requirements of the bladder 30. The static source 30 may be formed from a moisture or rot and degradation resistant material. In accordance with one or more embodiments, the static source 30 may also comprise protection against ultraviolet (UV) degradation. In accordance with one or more embodiments, the static source 30 may comprise a printed pattern that would act as camouflage to its environment, such as, for example, a mulch pattern or camouflaging pattern. In accordance with one or more embodiments, the camouflaging print may be provided directly on the flexible or rigid container 30, while, in accordance with embodiments, may be provided on a cover 101 configured for enclosing and covering the container 30. In accordance with one or more embodiments, a separate cover 30 may provide a protective barrier between the container 30 and the ground to prevent material degradation. The static source 30 may be positioned in relative proximity to a rainwater collection device 66, or may be spaced-apart therefrom. The container 30 may rest on the ground surface, may be positioned on a structure or platform, or may be buried under the ground in one or more embodiments.

Each static source 30 depicted in FIGS. 1A-1C, whether rigid or flexible, defines a first inlet 60 for receiving fluids and a first outlet 61 for permitting fluid to flow from the static source 30. In some embodiments, the first inlet 60 may be in fluid communication with a rain collection device 66, another static source 30 or some other collector or container. The first outlet 61 may be in fluid communication with a source line 32 or a flexible hose. Notably, some of the static fluid sources 30 further define a second inlet 62 and a second outlet 63 on one end, where the first inlet 60 and the first outlet 61 are positioned on an opposite end. In one or more embodiments, the static source 30 includes at least one inlet 60, 62 or outlet 61, 63 on one end of the container 30 and at least one inlet 60, 62/outlet 61, 63 on the opposite end of the container 30.

Figure 2A:
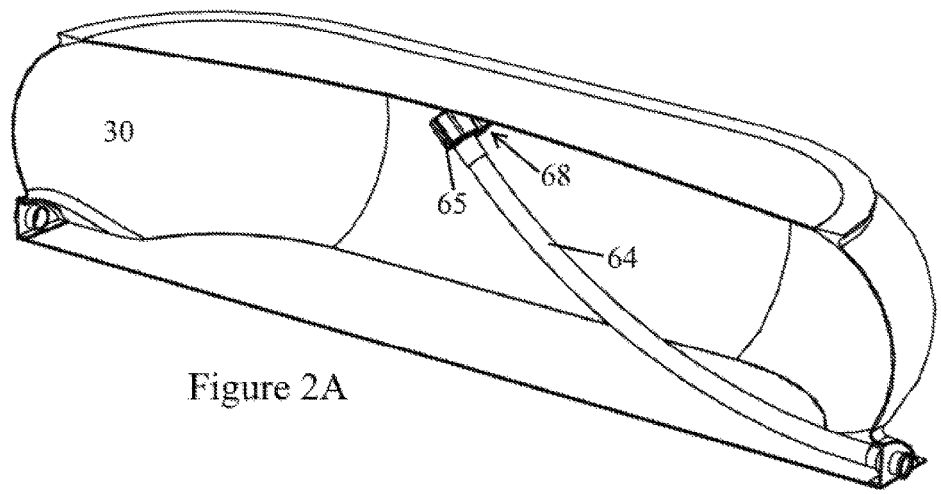
FIGS. 2A-2B are cross-sectional views of a static source having a bouyant flexible tube engaged to an outlet according to one or more embodiments of the presently disclosed subject matter.
Figure 2B:
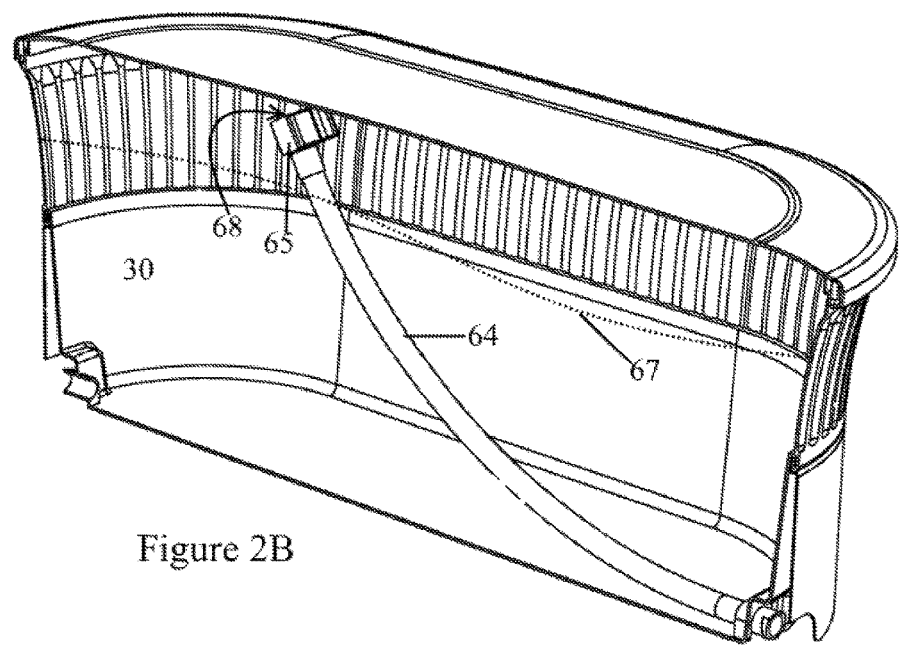

FIGS. 2A-2B are cross-sectional depictions of a flexible bladder 30 and a rigid container 30, respectively. The static sources 30 of both figures include a flexible tube 64 housed within the containers 30, engaged with the first inlet 60 and having a buoyant material 65 positioned distal from the first inlet. The buoyant material 65, and therefore the tube outlet 68 for discharging the incoming fluid, raises with the fluid level 67 in the static source 30 to minimize back-pressure to the first inlet. To restate, this configuration allows the static source 30 to fill while minimizing the back-pressure created by gravity from the stored fluids, thereby minimizing the pressure being applied to the incoming fluid flow of the first inlet 60. The buoyant material 65 and the tube outlet 68 are configured such that the tube outlet 68 remains positioned so that the flow from the tube outlet 68 is not substantially impeded by the container 30 itself.

Figures 3A, 3B:
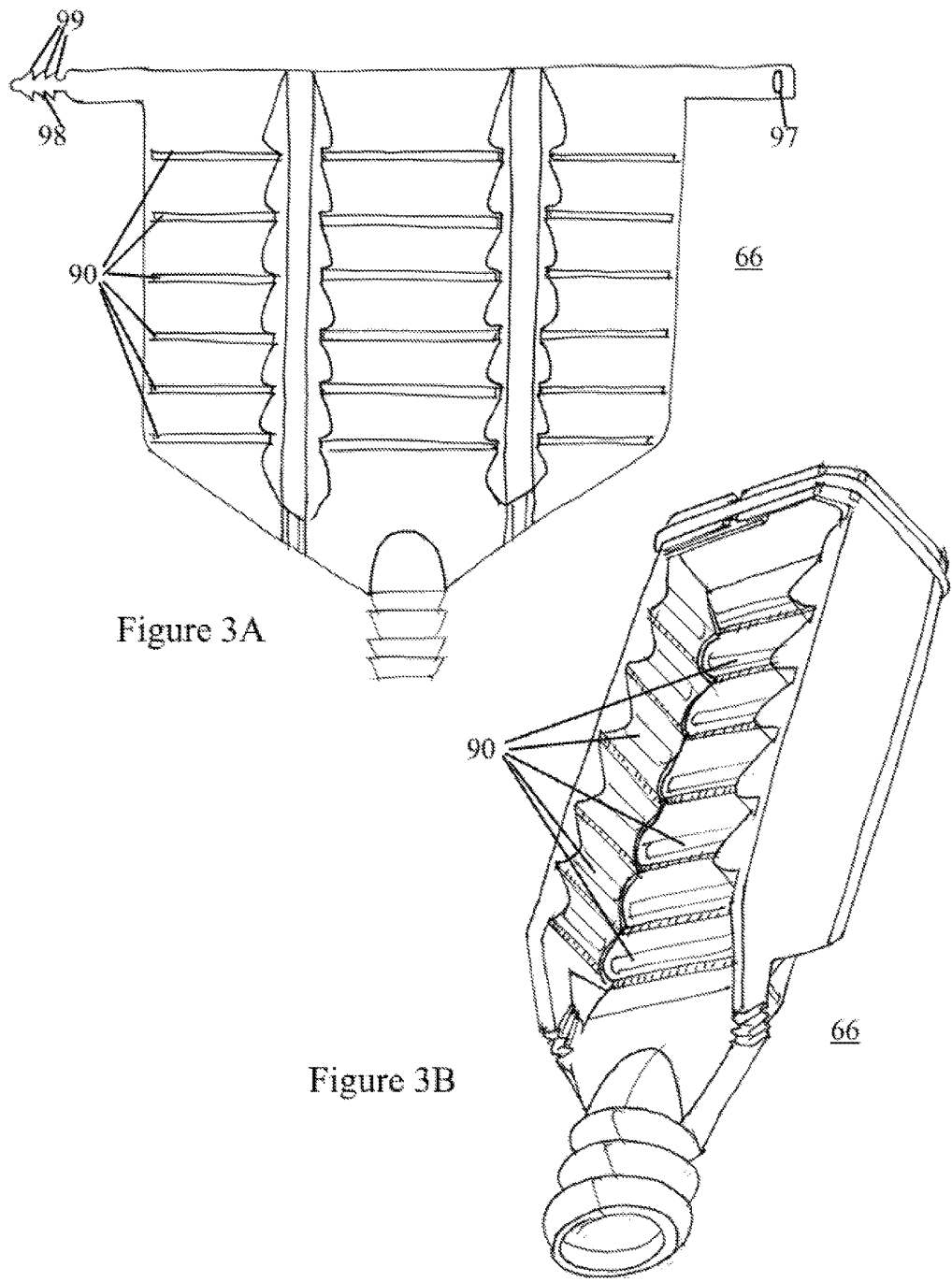
FIGS. 3A-3B are perspective views of a rain collection device according to one or more embodiments of the presently disclosed subject matter.

As shown in FIGS. 3A and 3B, a rainwater collection device 66 is configured for insertion into a gutter downspout. The horizontal apertures 90 of the rainwater collection device 66 are in flat form in FIG. 3A, but after being folded and bent, the device 66 and apertures 90 conform to the internal shape of a gutter downspout (FIG. 3B). The rain collection device 66 may be configured for insertion into a gutter and in fluid communication with a first inlet 60 through a drain line 69. The collection device 66 is customizable due to its flexible nature. The collection device 66 may be in a planar form with sufficient flexibility to fold, roll or bend for insertion into a downspout wherein the flexible planar form will expand and conform to the interior surfaces of the downspout after insertion. The device 66 may include a reception aperture 97 and a tab 98 having a plurality of ridges 99 for selectively locking and adjusting the dimensions of the device 66.

Returning to FIGS. 1A-1C, the fluid delivery systems 10 depicted include an eductor 12 defining a pressurized channel 24 in fluid communication with a flexible pressurized line 22 for translating pressurized fluids 26 from a spigot source 20. Further, the eductor 12 defines a source channel 34 in fluid communication with a flexible source line 32 for translating source fluids 36 from a static source 30. As will be described in more detail supra, the eductor 12 further defines a mixing chamber 14 engaged with both channels 24, 34 for entraining the source fluids 36 with the pressurized fluids 26 using Bernoulli principles; and a discharge aperture 16 for discharging the fluids 26, 36 from the mixing chamber. In FIGS. 1A-1C, the fluid delivery system 10 additionally comprises a discharge line 88 in fluid communication with the discharge aperture 16 and a spray nozzle 54.

Figure 4A:
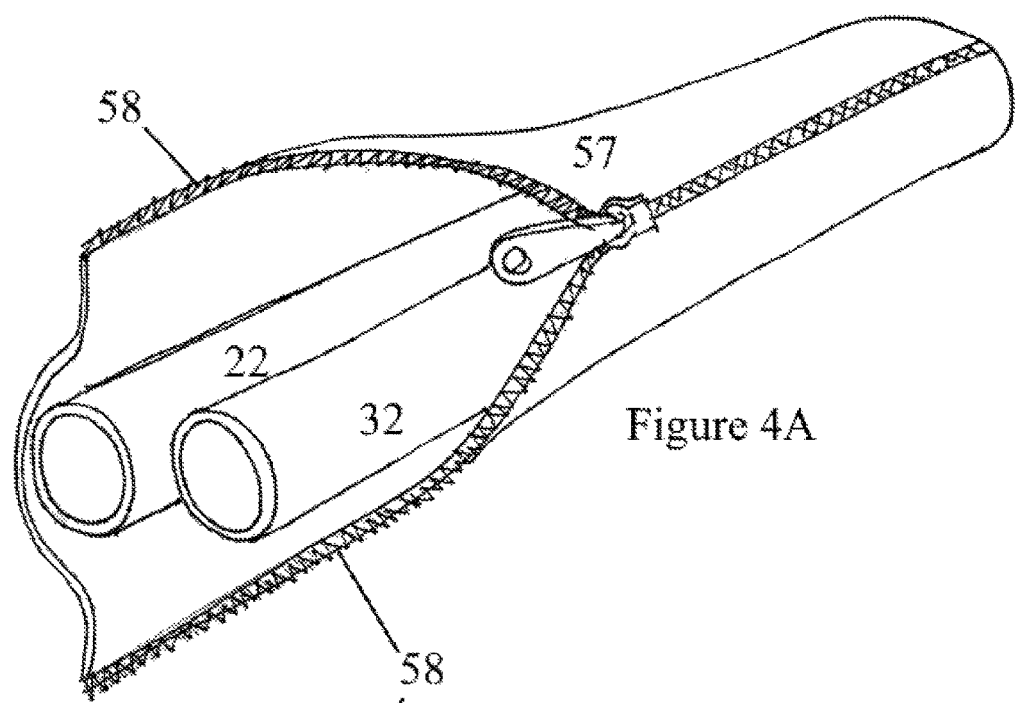
FIGS. 4A-4B are perspective views of a sleeve containing parallel lines according to one or more embodiments of the presently disclosed subject matter.
Figure 4B:
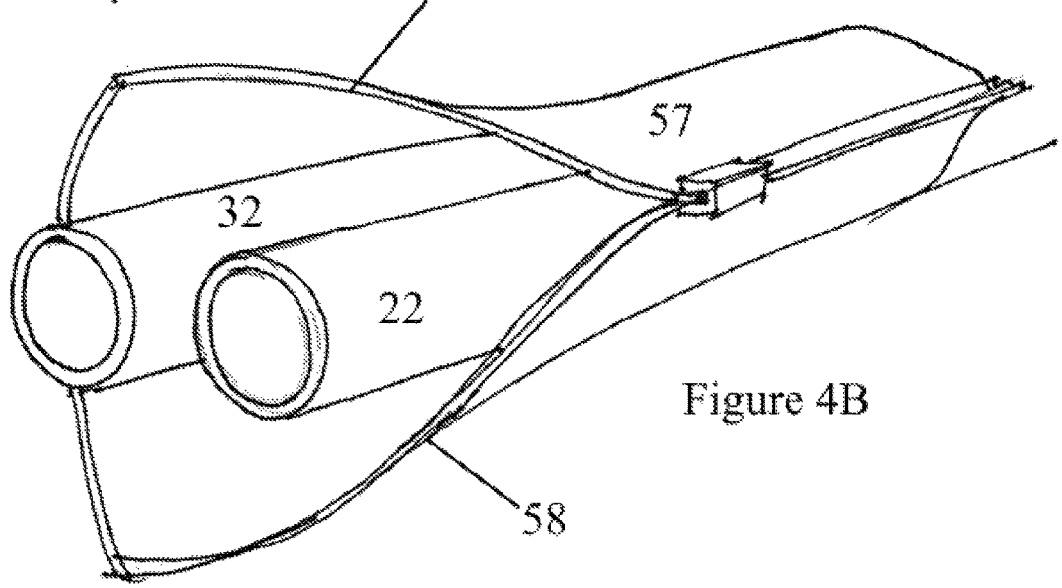

As is depicted in FIGS. 4A-4B, a method of temporarily attaching at least two flexible or rigid lines (22, 32 for example, but not limited thereto) together includes providing a flexible sleeve 57 that has opposing connectable zipper halves 58 such that the lines remain parallel to each other when pulled, moved or rolled onto a reel. The sleeve 57 may include opposing connectable zipper halves 58 on the whole, or a portion, thereof.

In order to siphon the fluids of a static source 30 so that the static source fluids may be used in a fluid delivery system 10, the energy and/or flow created by the pressurized fluids 26 must be utilized. In some embodiments herein, Bernoulli flow principles are used to utilize differences between the fluids of a static source 30 and the fluids 26 of a pressurized source 20. In other embodiments, the pressurized sources impart rotational forces to impact arms 72, centralized hubs 80 or other components of a fluid delivery system to draw fluids from their static sources 30. In yet other embodiments, both Bernoulli principles and rotational forces are utilized.

Figure 5A:
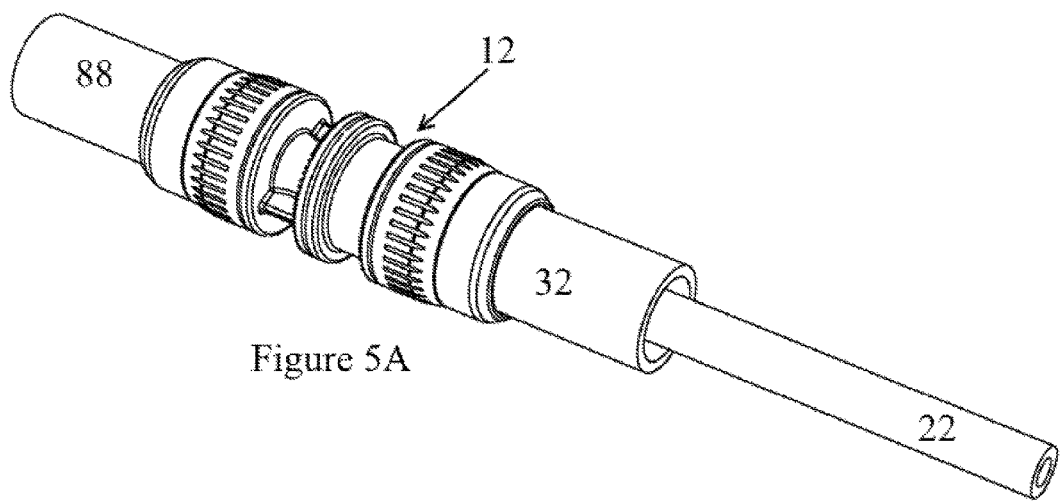
FIG. 5A is a perspective view of a pressurized line and a source line combining according to one or more embodiments of the presently disclosed subject matter.
Figure 5B:
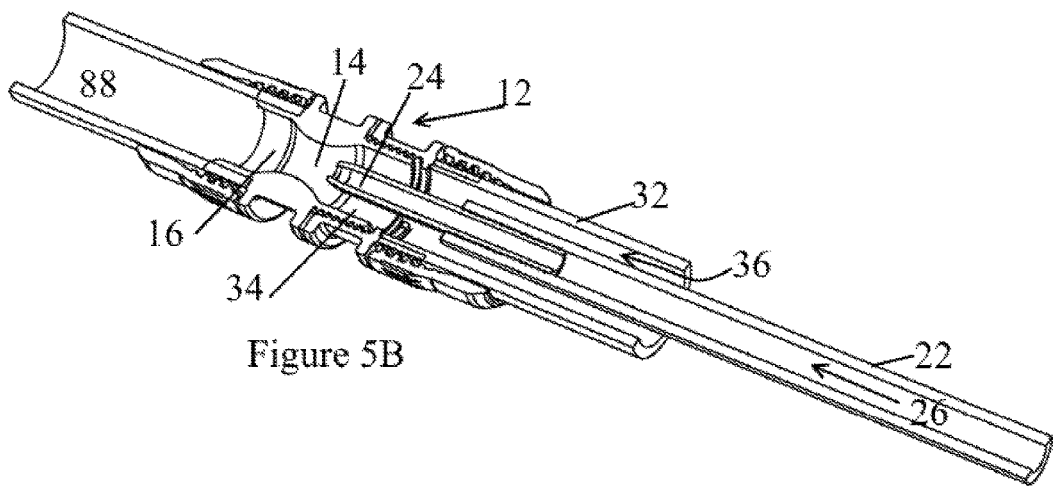
FIG. 5B is a cross-sectional view of a pressurized line and a source line mixing in an eductor according to one or more embodiments of the presently disclosed subject matter.

At least one embodiment of the utilization of Bernoulli flow principles to siphon fluids from a static source 30 is depicted in FIGS. 5A-5B. A static source (not shown) is in fluid communication with source line 32, which is in fluid communication with source channel 34 for translating the flow of the static fluids 36. Further, a pressurized source (not shown) is in fluid communication with pressurized line 22, which is in fluid communication with pressurized channel 24 for translating the flow of the pressurized fluids 26. In the embodiment of FIG. 5B, the pressurized line 22 is enwrapped by, and positioned concentrically within, the source line 32. Further, within the eductor portion 12 of the assembly depicted, the pressurized channel 24 is likewise enwrapped by, and positioned concentrically within, the source channel 34. Both channels 24, 34 are in fluid communication with the mixing chamber 14, where the Bernoulli principles permit siphoning of the source fluids 36 by the flow of the pressurized fluids 26. Because the velocity of the pressurized fluids 26 is greater than the velocity of the source fluids 36, the pressure differential between the two fluids 26, 36 causes the pressurized fluids 26, in effect, to siphon the surrounding source fluids 36 from the source channel 34 and to mix, or combine, together as the fluid flow continues towards the discharge aperture 16 and discharge line 88.

Figure 6A:
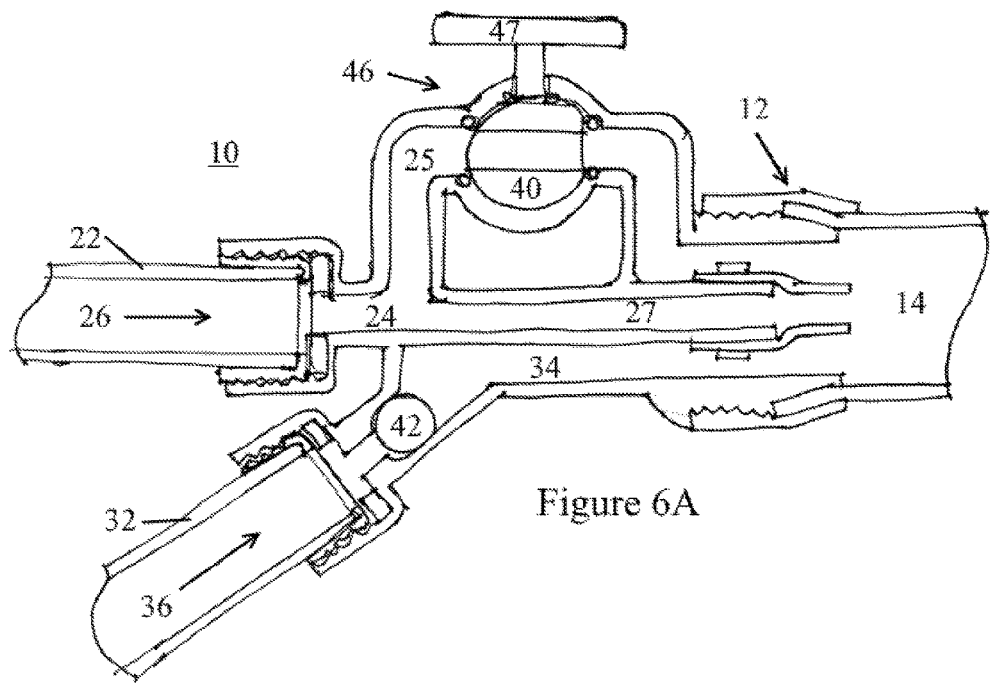
FIG. 6A is a cross-sectional view of a fluid delivery system having a source switch valve according to one or more embodiments of the presently disclosed subject matter.
Figure 6B:
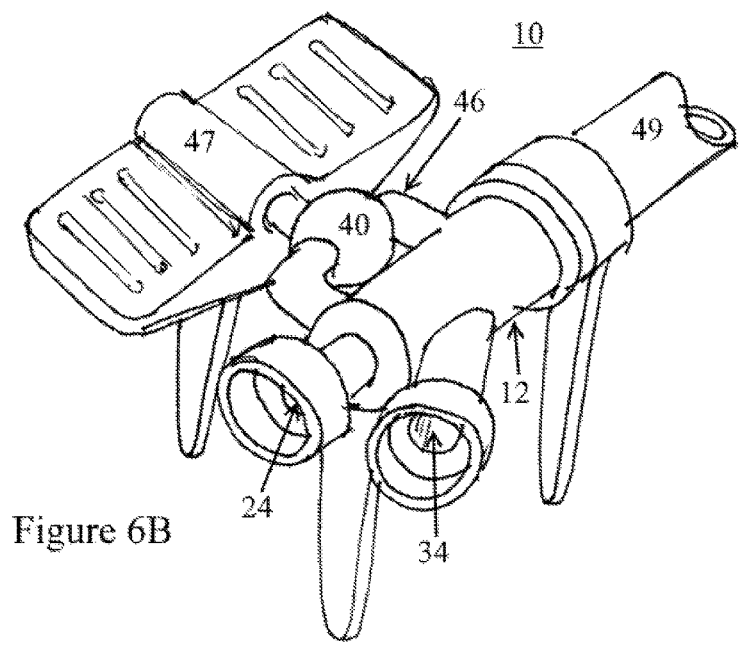
FIG. 6B is a perspective view of a fluid delivery system having a source switch valve according to one or more embodiments of the presently disclosed subject matter.
Figure 7A:
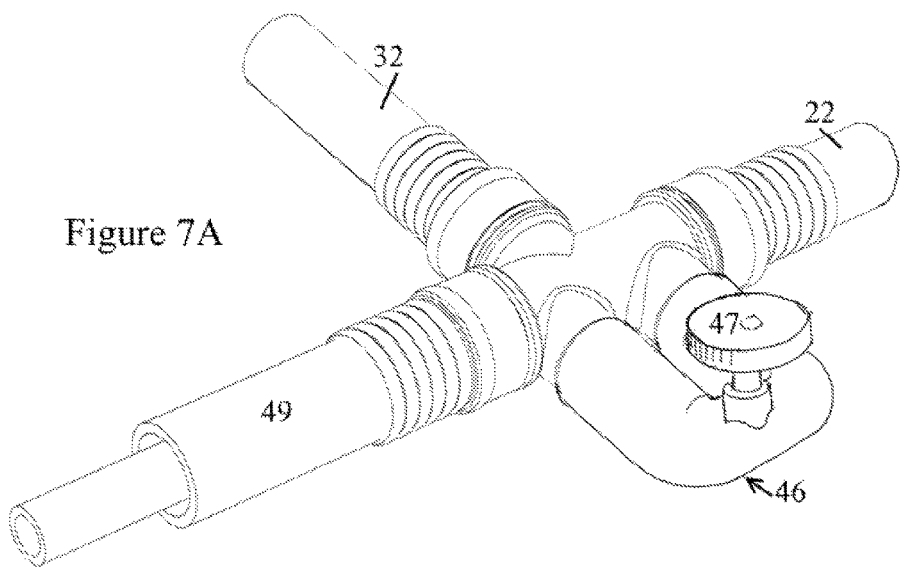
FIG. 7A is a perspective view of a fluid delivery system having a source switch valve according to one or more embodiments of the presently disclosed subject matter.
Figure 7B:
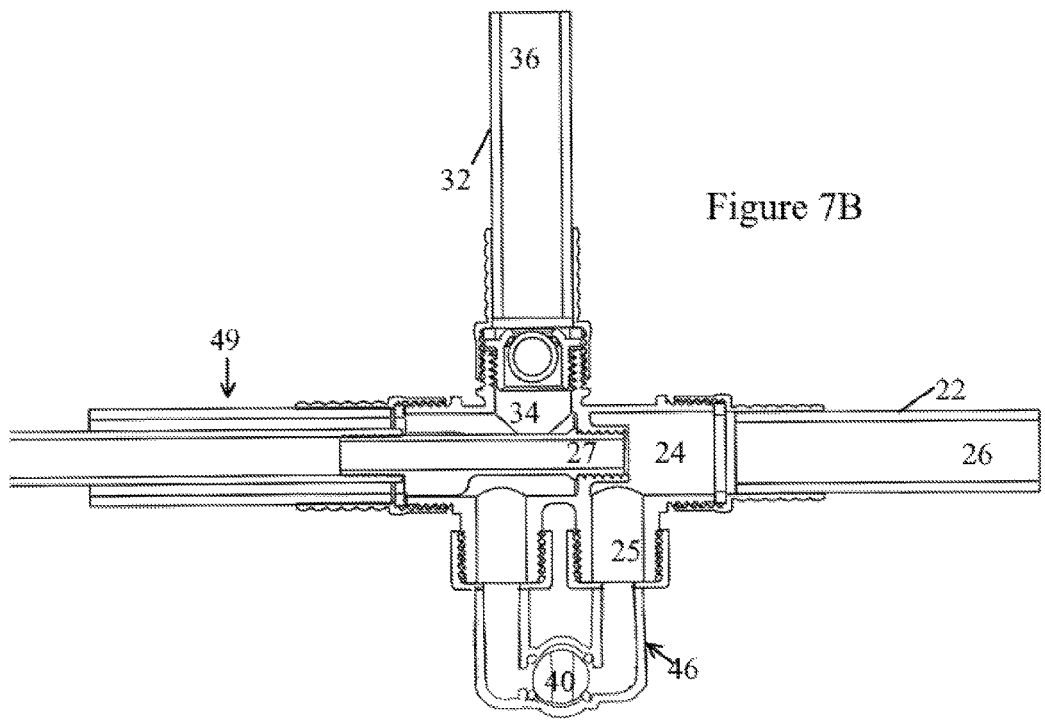
FIG. 7B is a cross-sectional view of a fluid delivery system having a source switch valve according to one or more embodiments of the presently disclosed subject matter.

In some embodiments, such as the embodiments depicted in FIGS. 6A-6B or the embodiments depicted in FIGS. 7A-7B, the line-within-a-line configuration of FIG. 5B can be created using a switch assembly 46. Turning to FIG. 6A, a source line 32 permits the flow of source fluids 36 from a static source 30 to a source channel 34. Similarly a pressurized line 22 permits flow of pressurized fluids 26 from a pressurized source 20 to a pressurized channel 24. The source channel 34 enwraps the later portion of the pressurized channel 24 and this configuration may be maintained throughout the length of the hose 49 (see FIG. 7B). Alternatively, as is depicted in FIG. 6A, the source channel 34 may only enwrap a portion of the pressurized channel 24 such that the pressurized channel 24 and source channel 34 are both in fluid communication with the mixing chamber 14. Notably, both embodiments depicted in FIGS. 6A and 7B could be useful with either a mixing chamber 14 or a line-in-line hose 49.

In some embodiments, the pressurized channel 24 has an upper portion 25 and a lower portion 27, through which the pressurized fluids 26 may flow. A source switch valve 40 may engage the upper portion 25 of the pressurized channel 24. The switch valve 40 may have a first position (shown)

for providing fluids from a pressurized source 20 to the source channel 34, and a second position (not shown) for providing fluids from a static source 30 to the source channel 34. When the switch valve 40 is in the second position, the pressurized fluids 26 may continue to flow through the lower portion 27 of the pressurized channel 24 and may continue to do so the length of the hose 49 (FIG. 7B) or may flow to the mixing chamber 14 (FIG. 6A). When the switch valve 40 is in the first position, the pressurized fluids 26 may flow through the upper portion 25 of the pressurized channel 24, through the switch valve 40, to the source channel 34 and may continue to do so the length of the hose 49 (FIGS. 6B, 7B) or may flow to the mixing chamber 14 (FIG. 6A). With the switch valve 40 in the first position, only pressurized fluids may be flowing through the hose 49 in the inner and outer lines. The source switch valve 40 may be activated between the open and closed positions using any number of switches 47, including the foot switch 47 depicted in FIG. 6B or the knob switch 47 depicted in FIG. 7A. The switches may engage the upper portion 25 remotely through the use of extended lines.

As is depicted in FIG. 6A a source check valve 42 may also be included with a switch assembly 46 of a fluid delivery system 10. The source check valve 42 may have a closed position (shown) for disallowing flow of the source fluids 36 to the mixing chamber 14, and having an open position for allowing flow of the source fluids 36 to the mixing chamber 14. Allowing flow of the source fluids 36 to the mixing chamber 14 may occur when the pressurized fluids 26 are discharged from the discharge aperture 16. The check valve may only allow flow from the source line 32 when pressurized fluid 26 is flowing so that the static source 30 cannot be filled with pressurized fluid 26 when the discharging of the fluids 26 is not taking place.

Similarly, the source check valve 42 may be used in the switch assembly 46 of FIGS. 7A-7B, the source check valve having a closed position (shown) for disallowing flow of the source fluids 36 to the hose 49, and having an open position for allowing flow of the source fluids 36 to the hose 49. Additionally, the source check valve 42 may be engaged with any portion of the fluid delivery assembly in a similar manner. The source check valve 42 be a valve responsive to pressure changes created by the flow (or lack of flow) of the pressurized fluids 26, or the source check valve 42 may be manually operated.

In some embodiments of the present invention, the fluid delivery system 10 may further include at least one sprinkler head 50 in fluid communication with, or housing within, the discharge aperture 16 for controlling discharge of the fluids 26, 36. Further, a fluid delivery system 10 may include at least two sprinkler heads 50 fluidly connected in series. For example, but not limited thereto, the sprinkler head 50 may be a series of percolating hoses for delivery fluids to a garden or lawn. In other embodiments, the sprinkler head(s) 50 includes at least one of: an impact sprinkler head, a handheld nozzle, a sealing flap sprinkler, a duckbill valve sprinkler, a conical head sprinkler, a gear-driven sprinkler head, a pop-up sprinkler head, and a rotary sprinkler head.

In at least one embodiment of the fluid delivery system 10, the sprinkler head 50 is a pop-up sprinkler and the system 10 includes a source check valve 42 positioned between the source channel 34 and the mixing chamber 14. The source check valve 42 has a closed position when the sprinkler head 50 is unextended and has an open position when the sprinkler head 50 is extended, with the flow of the pressurized fluids 26 extending the sprinkler head 50. In other words, the pressure created by activating the flow of the pressurized fluids 26 can extend the sprinkler head 50 upwards from the ground, thereby changing the source check valve 42 from a closed to an open position, thereby allowing the entrainment of fluid from the source channel 34.

In alternative embodiments, depicted in FIGS. 8A-8D, the sprinkler head 50 includes a conical stopper 56 having a closed position (FIG. 8D) for sealing the discharge aperture 16 and having an open position (not shown) for permitting discharge of the fluids 26, 26. Flow of the pressurized fluids 26 may be sufficient to force the conical stopper 56 into the open position. The conical stopper 56 acts as a conical distribution surface for the discharged fluids 26, 36, forcing the fluids into a spreading distribution pattern. Furthermore, introduction of helical grooves 48 on the surface of the conical distribution surface will cause the conical stopper to spin on a central axis to create a broader distribution via centrifugal force. A support 71 may be provided for supporting the eductor 12, sprinkler head 50, pressurized line 22, source line 32, and/or conical stopper 56. Further, at least one conical support 93 and/or a rotational support ball 94 may be included for allowing stabilized rotation of the conical stopper 56 upon application of the fluids 26, 36 thereto.

Figure 9A:
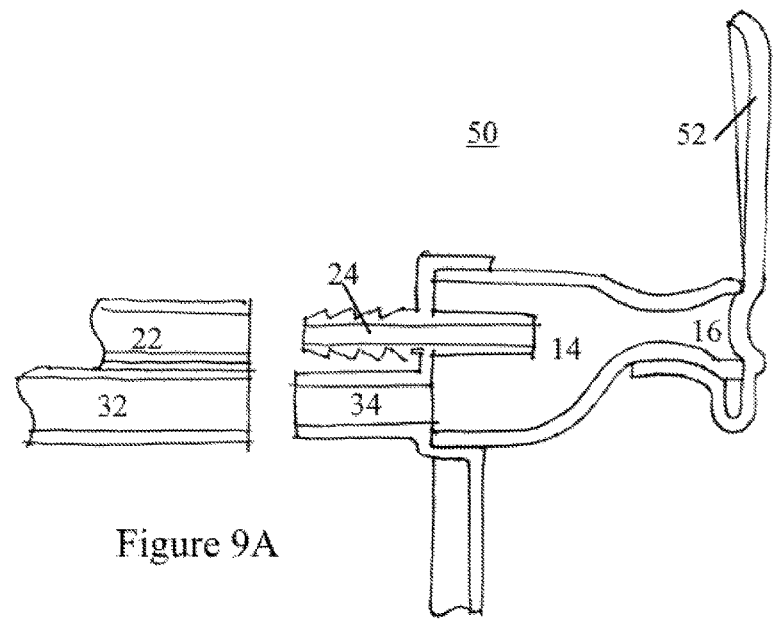
FIG. 9A is a cross-sectional view of a sealing flap according to one or more embodiments of the presently disclosed subject matter.
Figure 9B:
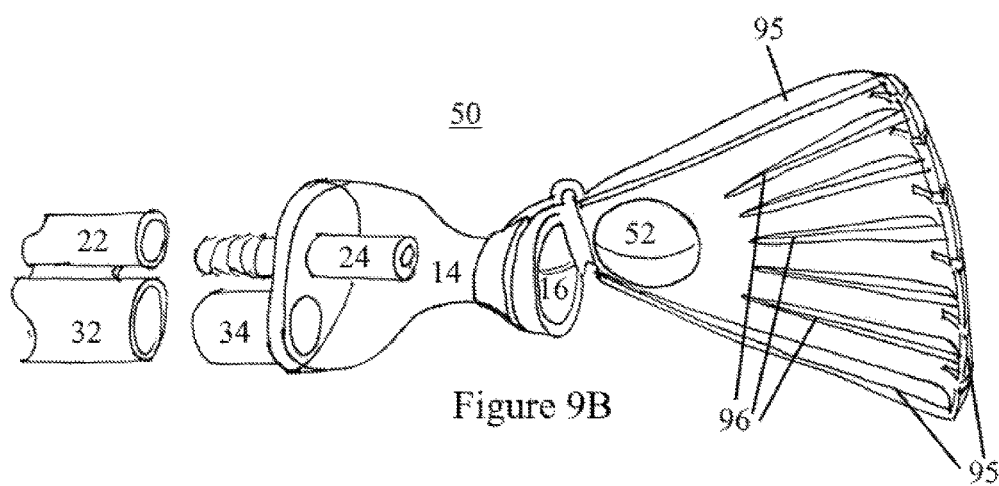
FIG. 9B is a perspective view of a sealing flap according to one or more embodiments of the presently disclosed subject matter.

As depicted in FIGS. 9A-9B, a sprinkler head 50 may include a flexible sealing flap 52. The flexible sealing flap 52 may be configured to be a distribution surface for distributing the discharged fluids 26, 36 into a desired pattern or location. Further, the flexible sealing flap 52 may have a closed position for sealing the discharge aperture 16 from gravity-based discharge of the fluids 26, 36 remaining in the discharge aperture 16. The flexible sealing flap 52 may have an open position for distributing the discharged fluids 26, 36 when the pressurized fluids 26 are activated for discharge. Use of the flexible sealing flap 52 prevents the lines 22, 32, channels 24, 34, and chambers 14, 16 from discharging due to gravity, as opposed when discharge occurs upon activation of the pressurized fluids 26 from the pressurized source 20. The flexible sealing flap 52 may be a light force valve that is opened by the motive force of the pressurized discharge. The flexible sealing flap 52 may contain distribution ridges 95 for controlling the spread or width or projection of the discharge, depending on the desired effect and the shape of the ridge(s) 95, and/or distribution channel ridges 96 for controlling the distribution within the spread of the discharge.

Figure 10A:
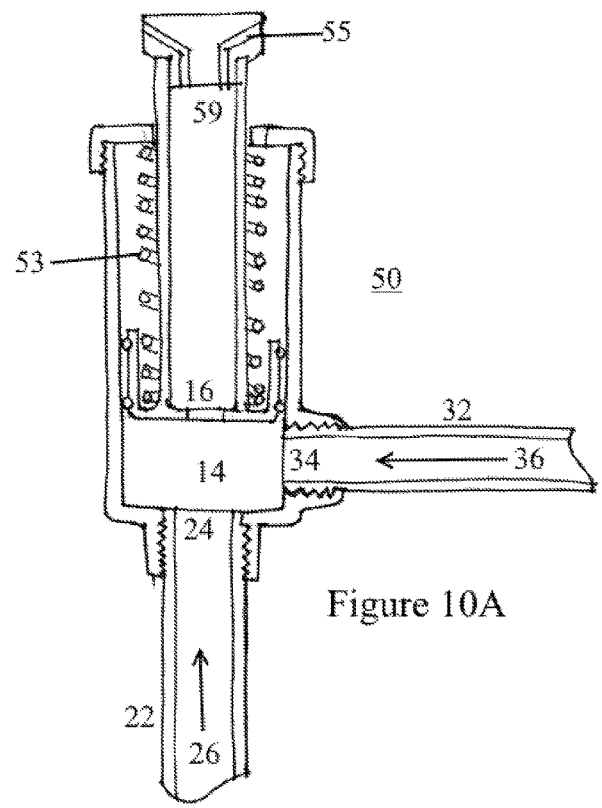
FIGS. 10A-10B are cross-sectional views of a sprinkler head including a duckbill valve and spring according to one or more embodiments of the presently disclosed subject matter.
Figure 10B:
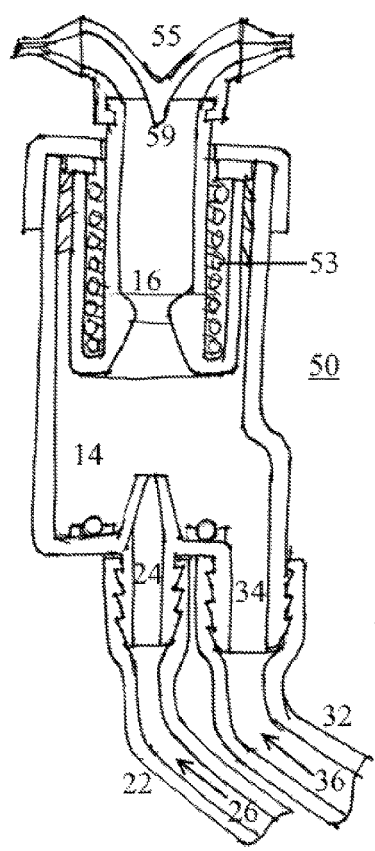

In another embodiment, as depicted in FIGS. 10A-10B, the sprinkler head 50 may include a duckbill valve 55 for sealing the discharge aperture 16 or exhaust aperture 59 of the sprinkler head to prevent leakage therefrom. The duckbill valve 55 may have a closed position (FIG. 10A) for sealing the discharge aperture 16 or exhaust aperture 59 from discharge of the fluids 26, 36 remaining in the discharge aperture 16. The duckbill valve 55 may have an open position (FIG. 10B) for allowing distribution of the discharged fluids 26, 36 when the pressurized fluids 26 are activated for discharge. The duckbill valve 55 may work in conjunction with a duck spring 53 to maintain the closed position when the pressurized fluids 26 are not activated. The duck spring 53 may be compressed by the pressurized fluids 26 into the open position.

Figure 11A:
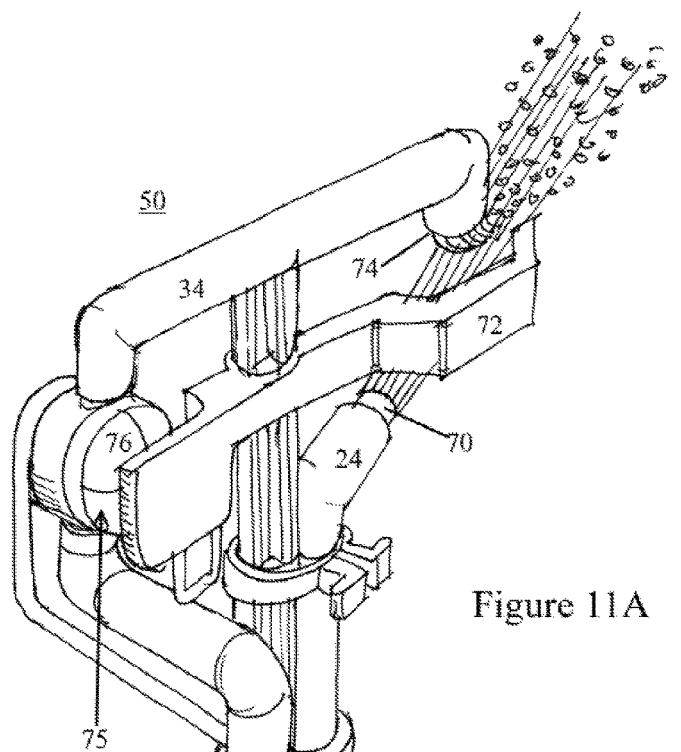
FIG. 11A is a perspective view of a diaphragm interacting with an impact arm according to one or more embodiments of the presently disclosed subject matter.
Figure 11B:
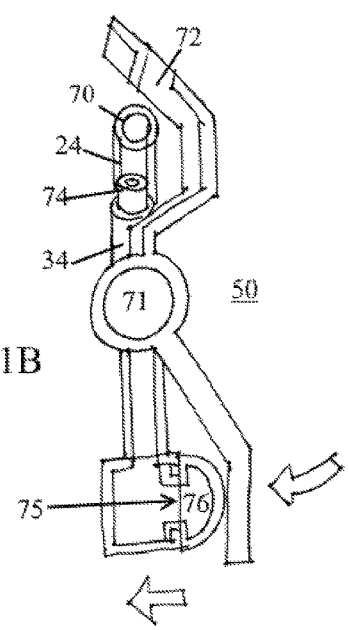
FIG. 11B is an overhead view of a diaphragm interacting with an impact arm according to one or more embodiments of the presently disclosed subject matter.

In some embodiments of the present invention, a fluid delivery system 10 is provided utilizing the kinetic energy of the pressurized fluids to create useful rotational forces. As depicted in FIGS. 11A-11B and 12, the system 10 may include a pressurized channel 24 in fluid communication with a flexible pressurized line 22, the pressurized channel 24 defining a pressurized exhaust aperture 70 on one end for discharging pressure fluids 26. By diverting the pressurized fluids onto a flywheel, rotational forces may be applied to an impact arm 72. The exact rotational force may be created by placing additional gears between the flywheel and the impact arm 72 to acquire the desired force. The system 10 may include an impact arm 72 for being rotated by the pressure fluids 26. Further, the system 10 may include a source channel 34 in fluid communication with a flexible source line 32, the source channel 34 defining a source exhaust aperture 74 on one end for discharging source fluids 36 for entrainment with the pressure fluids 26. The entrainment of the source fluids 36 by the pressurized fluids 26 may occur at a position before the pressurized fluids 26 are discharged, wherein the source exhaust aperture 74 is in fluid communication with the pressurized channel 24 for siphoning the source fluids 36 into the pressurized fluids 26 using the Bernoulli principles. Alternatively, as depicted in FIGS. 11A and 12, the entrainment of the source fluids 36 by the pressurized fluids 26 may occur at a position after the pressurized fluids 26 are discharged. For example, but not limited thereto, the source channel 34 may be oriented relatively perpendicularly to the pressurized channel 24 for siphoning the source fluids 36 into the discharged pressurized fluids 26 using the Bernoulli principles.

In some embodiments, a kinetic valve 75 for translating the source fluids 36 through the source channel 34 upon rotational impact of the impact arm 72 is provided. In FIGS. 11A-11B the kinetic valve 75 includes a diaphragm 76 for pumping the source fluids 36 upon rotational impact of the impact arm 72. The diaphragm 76 may be configured to provide a recoil force for counter-rotation of the impact arm 72. The kinetic energy/force of the pressurized fluids 26 may be converted to a pumping force by means of the diaphragm 76 that is opened and closed by the force created by the back and forth rotational motion of the stream of pressurized water moving the arm of the impact sprinkler head 50. The shape and elasticity of the diaphragm 76 provide the recoil force necessary to force the impact sprinkler arm 72 back into the stream of pressurized water.

In FIGS. 12A-12B, the kinetic valve 75 includes a cylinder chamber 77 housing a spring-loaded spherical object 78 for advancing the source fluids 36 upon rotational impact of the impact arm 72. The spring 79 may be configured to provide a spring force for counter-rotation of the impact arm 72. Further, the spherical object 78 may have a compliant outer surface that provides a light pressure seal to a distal end of the cylinder chamber 77, thereby sealing a kinetic source aperture 73 when the spherical object 78 is at rest and the spring 79 is fully extended. The cylinder 77 may contain a spherical shaped object 78 with a diameter slightly smaller than the diameter of the chamber 77 that is spring loaded to close the distal end of the cylinder 77. The inside diameter of the cylinder 77 may be dimensioned closely to the diameter of the spherical shaped object 78, thereby forcing source liquid 36 forward when moved in one direction and then closing the chamber 77 when moved in the opposite direction, thereby pumping liquid 36 from the static source 30 into the stream of the pressurized liquid 26 as it is being distributed by the sprinkler head 50. In one embodiment the source line 32 may have a single flexible section 33 (FIG. 12A) for permitting flexibility as the cylinder 77 shakes back and forth due to the oscillation of the impact arm 72. In another embodiment, as depicted in FIG. 12B, the source line 32 may include two flexible sections 33 for permitting movement of the cylinder 77 without creating additional movement in the source exhaust aperture 74.

In one embodiment, the pressurized fluids 26 exiting the pressurized exhaust aperture 70, and/or internal gear mechanisms, may cause the impact arm 72 to rotate about the support 71. This rotation translates the cylinder 77, opening the seal created between the object 78 and the kinetic source aperture 73 when the spring 79 is fully extended, thereby drawing source fluids 36 into the cylinder 77. The tension of the spring 79 imparts a counter-rotational force to the impact arm 72, thereby causing the impact arm to rotate in the opposite direction, such that the object 78 moves quickly through the drawn source fluids 36 to reseal the kinetic source aperture 73. When the cylinder 77 is rotated yet again by the impact arm 72, the object 78 pushes the drawn source fluids 36 further down the source line 34 to the source exhaust aperture 74, and draws another volume of source fluids 26 through the kinetic source aperture 73.

In the embodiments depicted in FIGS. 11A-11B and 12, a support 71 is provided for supporting the positions of the impact arm 72, the pressurized channel 24, and/or the source channel 24. Further, the support may house or support other components of the sprinkler head, including, but not limited to, the flywheel and gears.

Figure 13A:
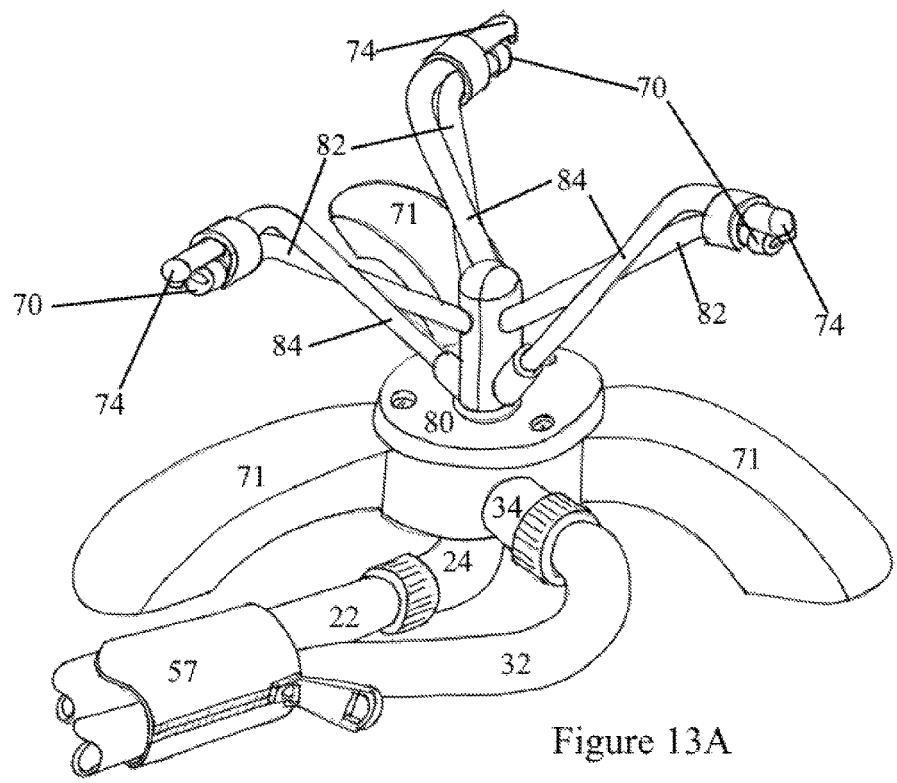
FIG. 13A is a perspective view of a central hub sprinkler system according to one or more embodiments of the presently disclosed subject matter.
Figure 13B:
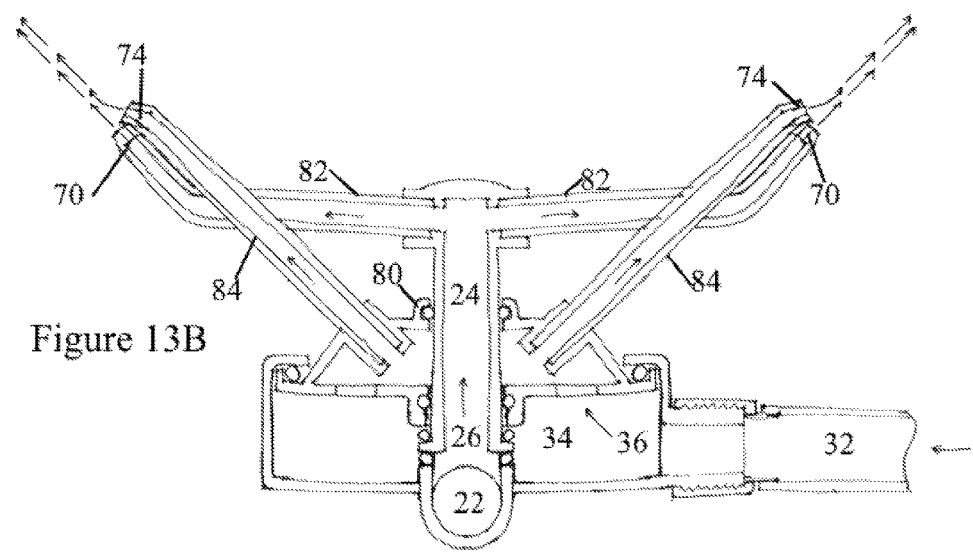
FIG. 13B is a cross-sectional view of a central hub sprinkler system according to one or more embodiments of the presently disclosed subject matter.
Figure 14A:
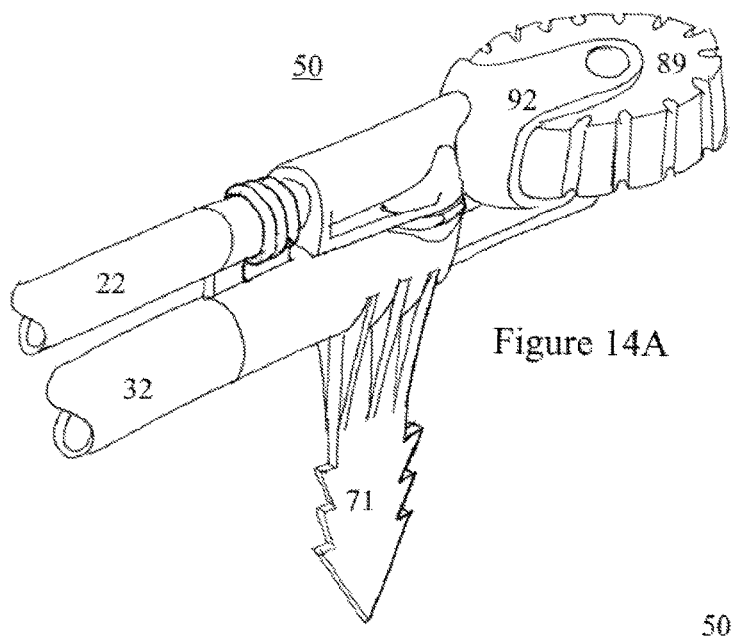
FIG. 14A is a perspective view of a micro-sprinkler head including a wheel according to one or more embodiments of the presently disclosed subject matter.
Figure 14B:
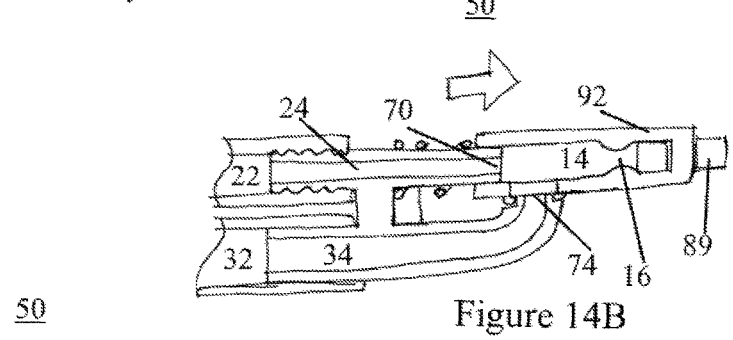
FIGS. 14B-14C are cross-sectional views of a micro-sprinkler head including a wheel according to one or more embodiments of the presently disclosed subject matter.
Figure 14C:
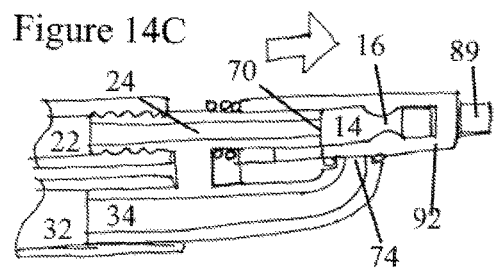

In yet another embodiment, depicted in FIGS. 13A-13B, a fluid delivery system 10 comprising a pressurized channel 24 in fluid communication with pressurized rotary arms 82 extending from a central hub 80 is provided. Each pressurized rotary arm 82 may include a pressurized exhaust aperture 70 on one end for discharging the pressurized fluids 26. The system 10 may also include a source channel 34 in fluid communication with source rotary arms 84 extending from the hub 80. Each source rotary arm 84 may include a source exhaust aperture 74 for discharging the source fluids 36. Further, each source rotary arm 84 and/or source exhaust aperture 74 may be located proximal to a respective pressurized rotary arm 82. The translation of the pressurized fluids 26 through the system may provide rotational force for rotating the hub 80 and the arms 82, 84 about a central axis of the hub 80. Additionally, the centrifugal forces created by the hub 80 rotation may draw source fluids 36 to the source exhaust apertures 74 for distribution into a path of the pressurized fluids 26 exiting the pressurized exhaust apertures 70 of the respective pressurized rotary arm 82. In some embodiments the source exhaust apertures 74 are in fluid engagement with the pressurized rotary arm 82 and are capable of distributing the source fluids 26 therein. Supports 71 may be provided for supporting at least the hub 80.

In at least one embodiment, a centrifugal siphoning micro sprinkler head 50 is provided, as depicted in FIGS. 14A-14C. The sprinkler head 50 may include a wheel 89 positioned tangentially to the discharged fluids 26, 36 of the pressurized discharge aperture 70. The wheel 89 may include a plurality of indentions or grooves 91 for providing rotational force when the pressurized fluids 26 are distributed through the discharge aperture 16, and for distribution of the pressurized fluids 26. The wheel 89 and wheel support 92 may be slidingly engaged with the pressurized channel 24 and source channel 34. Further, the wheel support 92 may house the mixing chamber 14. Upon application of pressure to the wheel 89 within the wheel support 92, the wheel support 92 may move from a closed position having no fluid engagement with the source channel 34 to an open position in fluid engagement with the source channel 34 through alignment of the wheel support aperture 93 with the source discharge aperture 74. The sprinkler head 50 may be supported by a support 71.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A fluid delivery system comprising:
   a pressurized channel in fluid communication with a flexible pressurized line for translating pressurized fluids;
   a source channel in fluid communication with a flexible source line for translating source fluids; and
   a sprinkler head, wherein the sprinkler head houses:
      a mixing chamber in fluid communication with the pressurized channel and in fluid communication with the source channel for entraining the source fluids with the pressurized fluids;
      a discharge aperture in fluid communication with the mixing chamber for discharging, from the mixing chamber, the source fluids entrained with the pressurized fluids;
      an exhaust aperture in fluid communication with the discharge aperture, the exhaust aperture for distributing the source fluids entrained with the pressurized fluids into an environment surrounding the sprinkler head;
      a seal between the source channel and the mixing chamber, wherein the seal has a closed position when the sprinkler head is in an unpressurized state and has an open position when the sprinkler head is pressurized,
      wherein flow of the pressurized fluids opens the seal thereby allowing the source fluids to be entrained with the pressurized fluids to be mixed for distribution, and
      wherein the mixing chamber is located immediately upstream of the discharge aperture.

2. The fluid delivery system of claim 1, further comprising a switch valve having a first position for providing fluids from a pressurized source to the source channel, and a second position for providing fluids from a static source to the source channel.

3. The fluid delivery system of claim 1, wherein the pressurized line and the source line are in parallel arrangement and enclosed within a sleeve.

4. The fluid delivery system of claim 1, wherein the source channel concentrically surrounds the pressurized channel where the channels are engaged with the mixing chamber.

5. The fluid delivery system of claim 1, further comprising at least two sprinkler heads fluidly connected in series.

6. The fluid delivery system of claim 1:
   wherein the sprinkler head includes a conical stopper having helical grooves,
   wherein the conical stopper has a closed position for sealing the discharge aperture and an open position for permitting discharge of the fluids,
   wherein fluid discharge forces the conical stopper into the open position and interacts with the helical grooves for spinning the conical stopper for distribution of the fluids.

7. The fluid delivery system of claim 1, wherein the sprinkler head includes a flexible sealing flap having a closed position for sealing the discharge aperture from gravity-based discharge of the fluids and an open position for allowing distribution of the fluids through the discharge aperture when the pressurized fluids translate through the pressurized line.

8. The fluid delivery system of claim 1, further comprising:
   a rainwater collection container defining at least a first inlet for receiving fluids and a first outlet in fluid communication with the source line; and
   a flexible tube housed within the rainwater collection container, engaged with the first inlet and having a buoyant material positioned distal from the first inlet,
   wherein the buoyant material rises with a fluid level to minimize back-pressure to the first inlet.

9. The fluid delivery system of claim 1, further comprising a rainwater collection device in a planar form with sufficient flexibility to fold, roll or bend for insertion into a downspout wherein the flexible planar form will expand and conform to the interior surfaces of the downspout after insertion, the collection device further including horizontal apertures for collecting rainwater.

10. The fluid delivery system of claim 1, further comprising a container for collecting the source fluids, wherein the container is in fluid communication with the flexible source line, and wherein the sprinkler head is separate from and positioned outside of the container.

11. A fluid delivery system comprising:
   a pressurized channel in fluid communication with a flexible pressurized line for translating pressurized fluids;
   a source channel in fluid communication with a flexible source line for translating source fluids,
   wherein the pressurized line and the source line are in parallel arrangement and enclosed within a sleeve;
   a sprinkler head, wherein the sprinkler head houses:
      a mixing chamber in fluid communication with the pressurized channel and in fluid communication with the source channel for entraining the source fluids with the pressurized fluids;
      a discharge aperture in fluid communication with the mixing chamber for discharging, from the mixing chamber, the source fluids entrained with the pressurized fluids; and
      an exhaust aperture in fluid communication with the discharge aperture, the exhaust aperture for distributing the source fluids entrained with the pressurized fluids into an environment surrounding the sprinkler head; and
   a seal between the source channel and the mixing chamber;
      wherein the sprinkler head is a pop-up sprinkler head, and
      wherein the seal has a closed position when the sprinkler head is unextended and has an open position when the sprinkler head is extended,
      wherein flow of the pressurized fluids extends the sprinkler head into the open position of the seal for entraining the source fluids from the source channel for distribution.

12. The fluid delivery system of claim 11, further comprising at least two sprinkler heads fluidly connected in series.

13. The fluid delivery system of claim 11, further comprising:
   a rainwater collection container defining at least a first inlet for receiving fluids and a first outlet in fluid communication with the source line; and a flexible tube housed within the rainwater collection container, engaged with the first inlet and having a buoyant material positioned distal from the first inlet, wherein the buoyant material rises with a fluid level to minimize back-pressure to the first inlet.

14. The fluid delivery system of claim 11, further comprising a rainwater collection device in a planar form with sufficient flexibility to fold, roll or bend for insertion into a downspout wherein the flexible planar form will expand and conform to the interior surfaces of the downspout after insertion, the collection device further including horizontal apertures for collecting rainwater.

15. A fluid delivery system comprising:

a pressurized channel in fluid communication with a flexible pressurized line for translating pressurized fluids;

a source channel in fluid communication with a flexible source line for translating source fluids;

wherein the pressurized line and the source line are in parallel arrangement and enclosed within a sleeve;

a sprinkler head, wherein the sprinkler head houses:

a mixing chamber in fluid communication with the pressurized channel and in fluid communication with the source channel for entraining the source fluids with the pressurized fluids;

a discharge aperture in fluid communication with the mixing chamber for discharging, from the mixing chamber, the source fluids entrained with the pressurized fluids;

an exhaust aperture in fluid communication with the discharge aperture, the exhaust aperture for distributing the source fluids entrained with the pressurized fluids into an environment surrounding the sprinkler head; and a seal between the source channel and the mixing chamber, wherein the sprinkler head is a pop-up sprinkler head, and wherein the seal has a closed position when the sprinkler head is unextended and has an open position when the sprinkler head is extended, wherein flow of the pressurized fluids extends the sprinkler head into the open position of the seal for entraining the source fluids from the source channel for distribution;

a rainwater collection container defining at least a first inlet for receiving fluids and a first outlet in fluid communication with the source line; and a flexible tube housed within the rainwater collection container, engaged with the first inlet and having a buoyant material positioned distal from the first inlet, wherein the buoyant material rises with a fluid level to minimize back-pressure to the first inlet.

16. The fluid delivery system of claim 15, further comprising: at least two sprinkler heads fluidly connected in series.

* * * * *